United States Patent Office 2,724,715
Patented Nov. 22, 1955

2,724,715
2-(P-CARBOXYBENZENESULFONYLAMINO)-5-SULFAMYL-1,3,4-THIADIAZOLE

James M. Sprague, Gwynedd Valley, and Carl Ziegler, Elkins Park, Pa., assignors to Merck & Co., Inc., Rahway, N. J., a corporation of New Jersey No Drawing. Application December 9, 1954,
Serial No. 474,279

5 Claims. (Cl. 260—306.8)

This invention relates to a new composition of matter, 2-(p-carboxybenzenesulfonylamino)-5-sulfamyl-1,3,4-thiadiazole. This compound has been found to be of great usefulness as a natriuretic agent, a natriuretic agent being one which enhances the excretion of sodium in the urine without necessarily changing the normal volume of urine excreted. The compound of this invention has the structural formula:

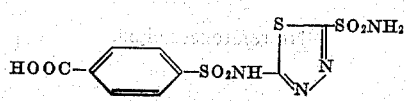

This invention also comprises the process of preparing the compound of this invention, the said process being generally described as follows:

On a molar basis, one part of 2-amino-5-sulfamyl-1,3,4-thiadiazole and at least 3 parts of a strong base are placed in about 10 parts by weight of water. The resulting solution is cooled in an ice bath and gently stirred by any convenient stirring apparatus. While stirring, one and one-half parts of p-carboxybenzenesulfonyl chloride is added in small portions such that the temperature does not exceed 20° C. After complete addition, stirring is continued for about one hour. The solution is made acid to Congo red (about pH 2) by the addition of hydrochloric acid and, with continued stirring and cooling, the product slowly crystallizes.

At least two moles of base per mole of p-carboxybenzenesulfonyl chloride is usually necessary. One mole of base reacts with the carboxyl group to form the salt. The other mole reacts with the hydrochloric acid which is formed as a by-product of the reaction.

Any organic or inorganic base can be used for this purpose as long as it performs the two-fold function outlined above and does not enter into competitive reaction with any of the reactants. In this connection, it is contemplated that sodium hydroxide, potassium hydroxide, anhydrous pyridine or an excess of 2-amino-5-sulfamyl-1,3,4-thiadiazole can be utilized. More than the minimum quantity of base can be used, of course, although it would be uneconomical to use too much in excess. We have found it preferable to use sodium hydroxide or potassium hydroxide for small scale operations, but it is conceivable that large manufacturing operations would employ some other basic medium.

The quantity of water used is not important except that sufficient water must be present so that good mixing and stirring of the reactants are possible. It is contemplated that solvents such as acetone could be used in addition to water inasmuch as they would not enter into the reaction but would provide volume for purposes of stirring and provide a good mixing medium for the reactants. We have found, however, that water is the preferable and most economical solvent medium. Cooling is absolutely essential with aqueous media. With the high concentration of base with respect to the concentration of p-carboxybenzenesulfonyl chloride, the possibility of hydrolysis of the p-carboxybenzenesulfonyl chloride to the sodium salt of p-carboxybenzenesulfonic acid must be held to an absolute minimum. The preferable temperature range is 0 to 20° C. The rate of addition of the p-carboxybenzenesulfonyl chloride must then be regulated in such a way that the actual reaction temperature remains at about 5° C. Cooling is not absolutely essential if anhydrous pyridine is used as the base.

An excess of p-carboxybenzenesulfonyl chloride is used in order to insure as complete a reaction as possible. It is essential that stirring be maintained throughout the entire addition to minimize hydrolysis of the p-carboxybenzenesulfonyl chloride to the sodium salt of the corresponding acid before the expected reaction with 2-amino-5-sulfamyl-1,3,4-thiadiazole occurs. In other words, the higher the temperature, and the less adequate the stirring, the greater the tendency for hydrolysis to occur. We have found that one hour of stirring time after complete addition of the p-carboxybenzenesulfonyl chloride is sufficient for small scale prepaartion. Less than one hour of stirring is satisfactory, and more than one hour does no harm.

The solution is finally made acidic to Congo red, about pH 2, with hydrochloric acid to precipitate the desired compound. It is not necessary to stir or cool, but these are well recognized aids used in the crystallization process.

The process can be illustrated schematically as follows using sodium hydroxide as an example of the base employed:

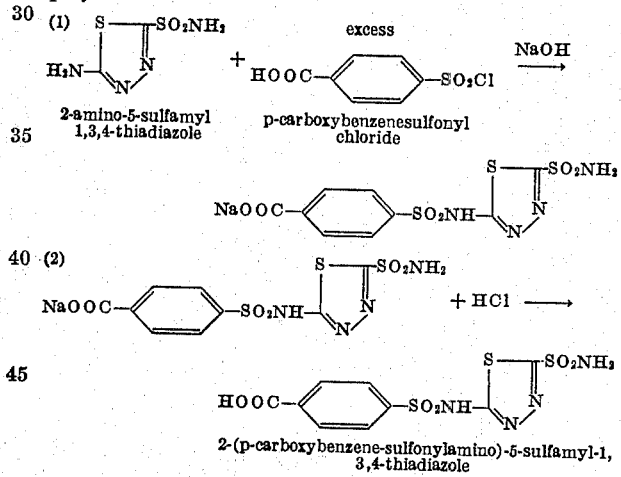

2-(p-carboxybenzene-sulfonylamino)-5-sulfamyl-1,3,4-thiadiazole

The following examples are given as illustrations of this invention, but details as given therein are not to be construed as limiting the scope thereof.

Example 1

A solution of 2-amino-5-sulfamyl-1,3,4-thiadiazole (13.5 grams, 0.075 mole) in 100 ml. of water containing sodium hydroxide (10 grams, 0.25 mole) is cooled to less than 10° C. in an ice bath. While the solution is stirred, p-carboxybenzenesulfonyl chloride (25 grams, 0.11 mole) is added in small portions such that the temperature of the stirred solution never exceeds 20° C. After the addition is complete, stirring is continued for one hour. The resulting clear solution is then made acidic to Congo red with concentrated hydrochloric acid. The product slowly crystallizes, is filtered, washed with water, and dried. The yield is 7.1 grams, M. P. 228–232° C. with effervescence. When recrystallized from 25% aqueous alcohol, 5.5 grams of product is obtained and melts at 243° C. with effervescence.

Anal.—Calc'd for $C_9H_8O_6N_4S_3$: C, 29.67; H, 2.21; N, 15.38. Found: C, 29.95; H, 2.33; N, 15.52.

Example 2

A mixture of 2-amino-5-sulfamyl-1,3,4-thiadiazole (54 grams, 0.3 mole) in 100 ml. of anhydrous acetone is cooled to less than 10° C. in an ice bath. While the mixture is stirred, p-carboxybenzenesulfonyl chloride (16.9 grams, 0.075 mole) is added in small portions such that the temperature of the stirred solution never exceeds 20° C. After the addition is complete, stirring is continued for one hour. The acetone solvent is then removed by evaporation and the residue is dissolved in 100 ml. of a 5% sodium hydroxide solution. The resulting clear solution is then made acidic to Congo red with concentrated hydrochloric acid. The product slowly crystallizes, is filtered, washed with water, and dried.

Example 3

The process according to Example 1 was followed with the exception that 50 ml. of anhydrous pyridine was used instead of sodium hydroxide in water.

While the invention has been described with particular reference to specific embodiments, it is to be understood that it is not to be limited thereto but is to be construed broadly and restricted solely by the scope of the appended claims.

What is claimed is:
1. 2-(p-carboxybenzenesulfonylamino) - 5 - sulfamyl-1,3,4-thiadiazole.
2. The method of preparing 2-(p-carboxybenzenesulfonylamino)-5-sulfamyl-1,3,4-thiadiazole which comprises reacting p-carboxybenzenesulfonyl chloride with 2-amino-5-sulfamyl-1,3,4-thiadiazole, acidifying the resulting solution and recovering the crystallized product.
3. The method of preparing 2-(p-carboxybenzenesulfonylamino)-5-sulfamyl-1,3,4-thiadiazole which comprises reacting p-carboxybenzenesulfonyl chloride with 2-amino-5-sulfamyl-1,3,4-thiadiazole in a basic medium at a temperature of less than 20° C., acidifying the resulting solution with hydrochloric acid, and recovering the crystallized product.
4. The method of preparing 2-(p-carboxybenzenesulfonylamino)-5-sulfamyl-1,3,4-thiadiazole which comprises reacting p-carboxybenzenesulfonyl chloride with 2-amino-5-sulfamyl-1,3,4-thiadiazole in an aqueous sodium hydroxide solution at a temperature of about 10° C., acidifying the resulting solution with hydrochloric acid, and recovering the crystallized product.
5. The method according to claim 4 in which anhydrous pyridine is used in place of aqueous sodium hydroxide.

No references cited.